United States Patent [19]
Cook

[11] Patent Number: 5,836,091
[45] Date of Patent: Nov. 17, 1998

[54] TRACTION ENHANCING ARTICLES OF MANUFACTURE

[76] Inventor: Michael H. Cook, 224 Farewell, Fairbanks, Ak. 99701

[21] Appl. No.: 956,493

[22] Filed: Oct. 22, 1997

Related U.S. Application Data

[63] Continuation-in-part of Ser. No. 707,000, Sep. 4, 1996, abandoned.

[51] Int. Cl.$^6$ ............................ A43C 15/00; B60C 11/00; A63C 11/00
[52] U.S. Cl. ............................ 36/59 R; 152/208; 280/809; 280/11.3; 2/160
[58] Field of Search ................................ 36/59 R, 59 A, 36/59 B, 59 C, 7.6, 7.7; 152/208; 280/809, 11.3, 87.042, 811; 2/160

[56] References Cited

U.S. PATENT DOCUMENTS

| | | | |
|---|---|---|---|
| 1,193,139 | 8/1916 | Harden | 152/208 X |
| 1,696,619 | 12/1928 | Bell | 36/134 X |
| 2,408,152 | 9/1946 | Porcelli | 152/208 X |
| 2,732,065 | 1/1956 | Marchese | 152/208 |
| 3,082,549 | 3/1963 | Dolceamore | 36/134 X |
| 3,323,572 | 6/1967 | Farah | 152/208 |
| 3,667,141 | 6/1972 | White | 36/67 B |
| 3,768,183 | 10/1973 | Fessenden | 36/67 R |
| 4,108,452 | 8/1978 | Baron | 36/15 X |
| 4,393,604 | 7/1983 | Crowley | 36/67 A |

FOREIGN PATENT DOCUMENTS

| | | | |
|---|---|---|---|
| 3704847 | 8/1988 | Germany | 152/208 |
| 301111 | 12/1988 | Japan | 152/208 |

Primary Examiner—Ted Kavanaugh
Attorney, Agent, or Firm—Alfred F. Hoyte, Jr.

[57] ABSTRACT

An improved traction enhancing article is provided which is applicable to many different items such as shoes, skateboards, snowboards and the like. The traction enhancing article has a plurality of regularly spaced cleats embedded in a flexible base which, in at least one embodiment, has an adhesive backing allowing it to be removably secured to a variety of different items. The cleats are preferably formed of aluminum and have a hexagonal base which tapers to a rounded top. Both sides of the surface are roughened to enhance traction and to ensure the cleat remains embedded in the base even under extreme stress conditions.

5 Claims, 5 Drawing Sheets

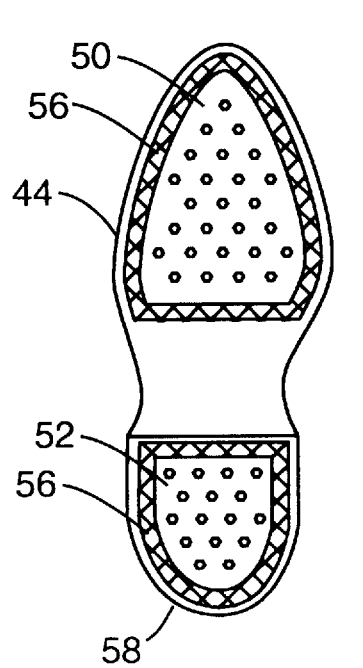
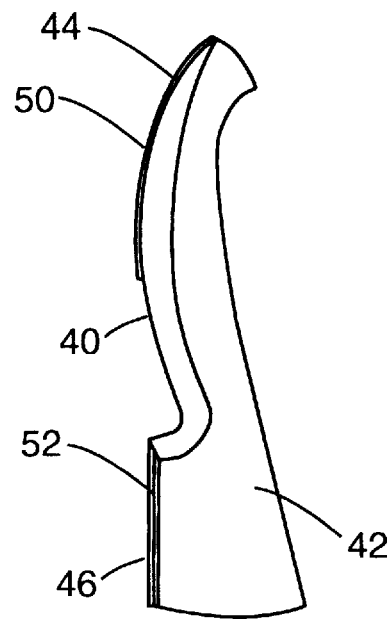
Figure 5a
Figure 5b
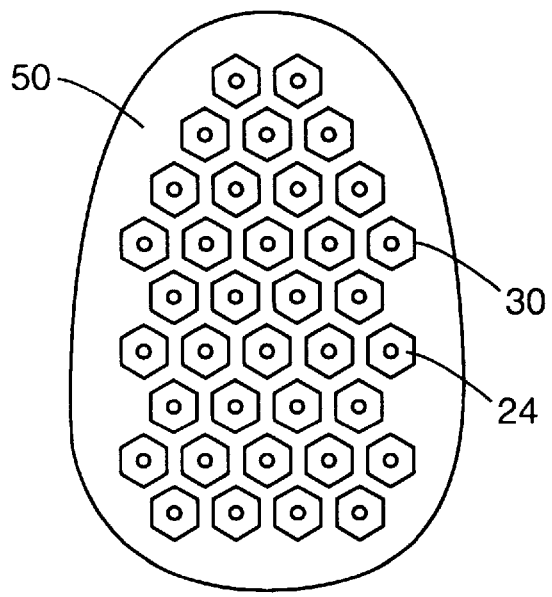
Figure 5c

TRACTION ENHANCING ARTICLES OF MANUFACTURE

This application is a CIP of U.S. application Ser. No. 08/707,000 filed Sep. 4, 1996, now abandoned.

BACKGROUND OF THE INVENTION

1. Field of the Invention

The present invention relates to traction enhancing articles of manufacture and methods of making the same. More particularly, the invention contemplates an article for improving traction on packed snow and ice which has many different applications.

Thus it can be seen that the potential fields of use for this invention are myriad and the particular preferred embodiment described herein is in no way meant to limit the use of the invention to the particular field chosen for exposition of the details of the invention.

A comprehensive listing of all the possible fields to which this invention may be applied is limited only by the imagination and is therefore not provided herein. Some of the more obvious applications are mentioned herein in the interest of providing a full and complete disclosure of the unique properties of this previously unknown general purpose article of manufacture. It is to be understood from the outset that the scope of this invention is not limited to these fields or to the specific examples of potential uses presented hereinafter.

2. Description of the Prior Art

Traction enhancing devices are old and well known in the art. The following known prior art has been directed to providing a summary of the devices of the prior art. As will be seen, the simplicity and effectiveness of my invention is not rivaled in the prior art.

U.S. Pat. No. 3,803,951 issued to Mitchell discloses a non-slip article of manufacture having a plurality of irregularly arranged pieces of scrap aluminum embedded in a flexible base. By contrast, the present invention employs aluminum or other traction enhancing material, having a specific shape or contour and regularly arranged on an adhesive backed strip precisely placed so as to provide the maximum traction for the specific article to which it is applied.

U.S. Pat. No. 3,844,056 discloses a shoe anti-slip device having a pointed metal cap which is adapted to be adjustably positioned within a threaded receptacle formed within the heel of a shoe. By contrast, the present invention contemplates a traction enhancing article which, when applied to a shoe, has a plurality of regularly spaced cleats distributed on both the sole and the heel of the shoe.

U.S. Pat. No. 5,367,793 issued to Deacon et al. discloses a winter golf shoe spike which screws into and out of a threaded aperture in the shoe. By contrast, the present invention has a spike or cleat which is embedded into an adhesive backed flexible base which can conform to the article to which it is applied.

U.S. Pat. No. 2,930,148 issued to Parker discloses a shoe sole attachment which uses cleats of a "standard" shape which protrude from a base which is secured to the shoe by clamps and screws. By contrast, the present invention contemplates a cleat having a unique shape which is specially designed for enhancing traction on ice and snow.

None of the above inventions and patents, taken either singly or in combination, is seen to describe the instant invention as claimed.

SUMMARY OF THE INVENTION

Briefly, the invention comprises an improved traction enhancing article which is applicable to many different items such as shoes, skateboards, snowboards and the like. The traction enhancing article has a plurality of regularly spaced cleats embedded in a flexible base which, in at least one embodiment, has an adhesive backing allowing it to be removably secured to a variety of different items. The cleats are preferably formed of aluminum and have a hexagonal base which tapers to a rounded top. Both sides of the surface are roughened to enhance traction and to ensure the cleat remains embedded in the base even under extreme stress conditions.

Accordingly, it is a principal object of the invention to provide new and improved traction enhancing devices which overcome the disadvantages of the prior art in a simple but effective manner.

It is a major object of this invention to provide an improved traction enhancing device which can be attached to the underside of the heel and sole of a shoe.

It is another object to provide a traction enhancing device specially designed to improve traction on snow and ice.

It is another object of the invention to provide an improved traction enhancing device which has a plurality of gripping members or cleats which are shaped for superior traction on ice and hard packed snow.

It is another object of the invention to provide an improved traction enhancing device having cleats made out of aluminum.

It is another object of the invention to provide an improved traction enhancing device which has many applications.

It is an object of this invention to provide a plurality of anti-slide patches which can be attached to a hockey uniform including the gloves and skates.

It is another object of the invention to provide anti-skid patches which have a plurality of gripping members or cleats which are shaped for superior traction on ice and hard packed snow.

It is another object of the invention to provide an improved traction enhancing device having an adhesive backing.

Finally, it is a general goal of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 5(a) shows a bottom view of a shoe with the traction enhancing article permanently attached to the sole and heel of a slip over article designed to be worn over a shoe.

FIG. 5(b) shows a side view of the slip over of FIG. 5(a).

FIG. 5(c) shows a partially broken away bottom view of a section of the traction enhancing article of the present invention adapted to be secured within the sole of the slip over of FIGS. 5(a) and 5(b).

DETAILED DESCRIPTION OF THE PREFERRED EMBODIMENTS

Figure 1:
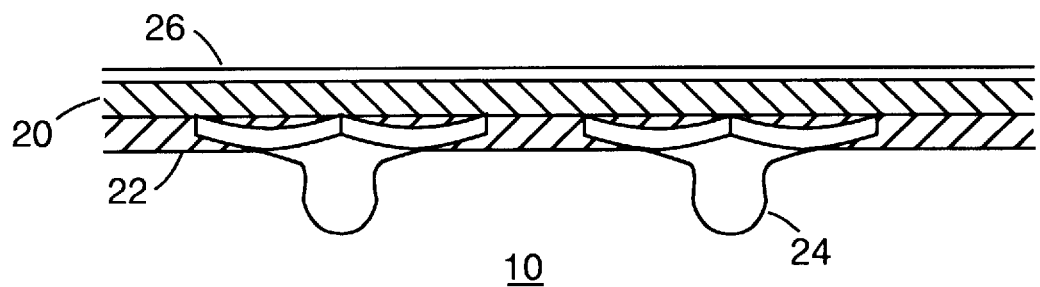
FIG. 1 is a cross-section of the traction enhancing article of the present invention.
Figure 2:
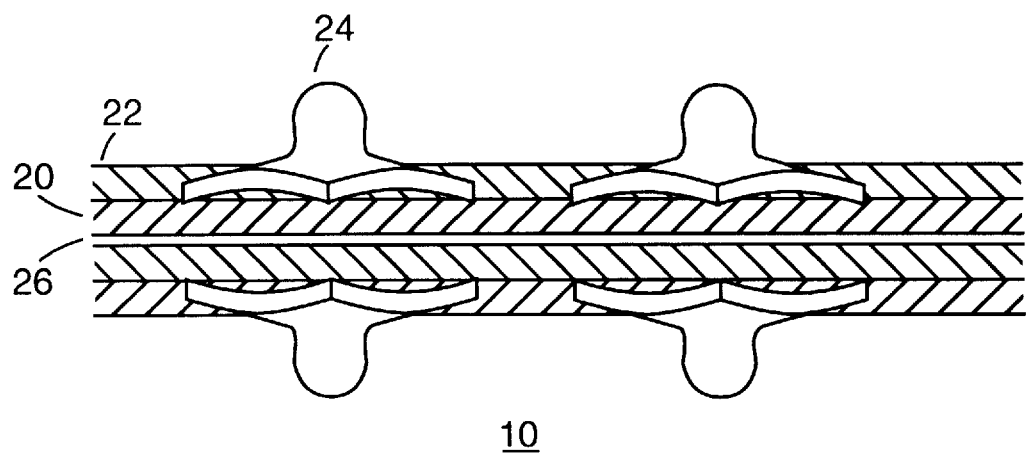
FIG. 2 is a cross-section of an alternative embodiment of the traction enhancing article of the present invention.

Referring now to FIGS. 1 and 2, a cross section of two embodiments of the traction enhancing article of manufacture of the present invention, generally indicated by the numeral 10, is shown. The article 10 can be applied to many different devices and articles such as shoes, skateboards, snowboards and the like. The article also has other applications as will be explained in detail later.

The article has four basic components, a first rubber layer or base 20, a second rubber layer 22 which is adhered to the first rubber layer 20, the cleats 24, and, in some embodiments, an adhesive layer 26. In the embodiment shown in FIG. 2, the adhesive layers are placed back to back so that both the article has opposing cleated surfaces.

The base 20, is preferably formed of a durable flexible material such as rubber. In the preferred embodiment, the base 20 and the second layer 22 are made of a vulcanized rubber nylon compound. The base 20 should be about twice as thick as the second layer 22 and acts as a shock absorber to minimize compression damage to the cleats 24. The second layer 22 or adhesion layer 22 acts to secure the cleats 24 in place.

Figure 3:
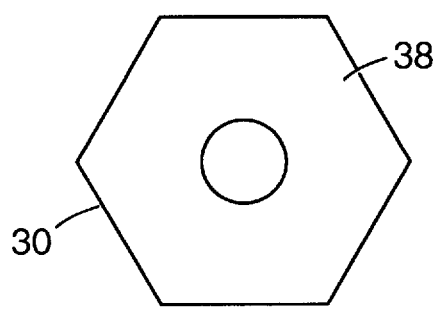
FIG. 3 shows a bottom view of a cleat which is used with the traction enhancing article of the present invention.
Figure 4:
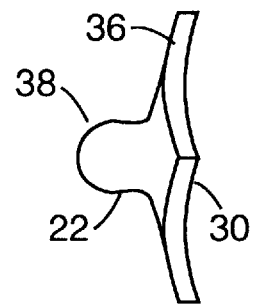
FIG. 4 shows a partially broken away side view of the cleat of FIG. 3.

The cleats 24 are formed from a sheet of durable non-slip material. In the preferred embodiment, the cleats 24 are made of aluminum which is relatively hard and is known for its non-slip characteristic especially on wet or icy surfaces. Also, hardened plastics may be used as the material for the cleats 24. As can be seen more clearly in FIGS. 3 and 4, the cleats 24 have a hexagonal base 30, and a centrally located protrusion 32 which terminates in a rounded tip 34. Both the top surface 36 and the underside 38 are roughened to increase the bonding area thereby more firmly embedding the cleat 24 in the adhesion layer 22.

The cleats 24 may be stamped from a hexagonal shaped sheet of roughened aluminum and thus protrusion 32 will be generally hollow. If the cleats 24 are made from plastic, they should be solid to decrease molding costs.

A 3M® type adhesive layer may be used for layer 26. As is well known, this type of adhesive layer has a removable protective covering (not shown) which is removed when the article 10 is to be applied. It should be noted that in some embodiments the article 10 may be applied as part of the fabrication process of the device to which it is to be used. Thus the adhesive layer 26 may not be necessary as another type of adhesive or adhesive method may be more appropriate.

Referring now to FIGS. 5(a), 5(b), and 5(c), a slip over 40 is shown. The slip over 40 is designed to be worn over shoes to provide protection from moisture and to enhance traction on rain slick, icy, or snowy surfaces. The upper portion 42 is made of rubber or other elastic waterproof material. Embedded in recesses formed in both the sole 44 and heel 46 portions of the slip over 40 are appropriately shaped sections 50, 52 of the article 10 of the present invention. In this particular application it has been found that the spacing between adjacent parallel sides of the hexagonal bases 30 of the cleats 24 should be about 0.125". This spacing maximizes traction while minimizing the number of cleats 24 used per slip over 40. Of course, more or less cleats 24 may be used as desired to increase traction or reduce cost.

The border portion 56 about the sole 44 and heel 46 portions may be a rectangular pattern with channels 58.

Figure 6:
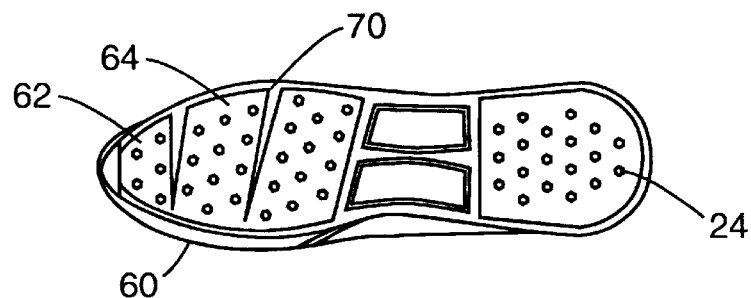
FIG. 6 shows a bottom view of an athletic shoe with the traction enhancing article attached.

Another application of the traction enhancing article 10 of the present invention is shown in FIG. 6. In this application, a winter running shoe 60 is fabricated with sections 62, 64, 66, and 68 of the traction enhancing article 10 built in. The winter running shoe 60 is especially adapted for use in cold climates where athletes must run on snow or ice for several months of the year. By inserting the sections 62, 64, 66, and 68 at the time of fabrication, maximum durability is obtained. Also, the wearability and comfort of the shoe is increased, a key factor for athletic shoes which are often used in high stress situations. In order to prevent tear out of the cleats 24 the sections 62, 64, 66 are provided in the sole 70 of the shoe 60. This arrangement reduces excessive flexing which may cause the cleats 24 to become dislodged.

Figure 7:
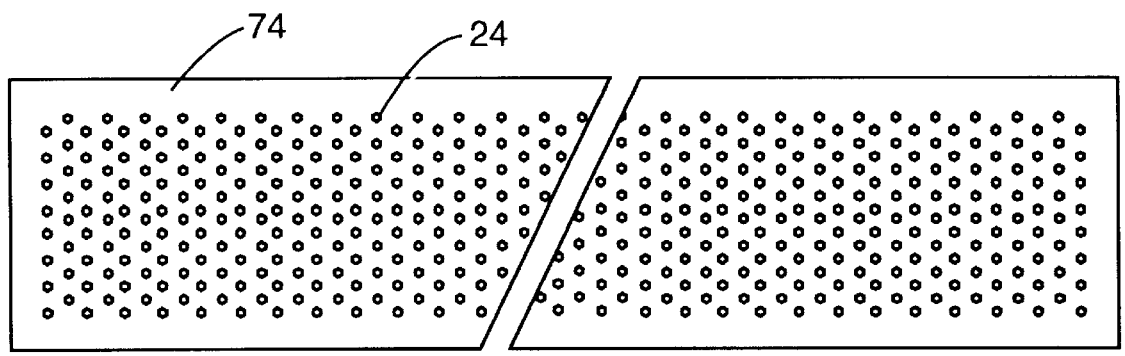
FIG. 7 shows a top view of a traction enhancing strip having cleats on both sides as shown in the cross section of FIG. 2.

FIG. 7 shows a traction device 74 for use with automobile tires. The traction device 74 is a single strip of the article 10 as shown in FIG. 2 with cleats 24 on both sides. This device is about the width of an average tire (8–10") and may be rolled up for storage in an automobile trunk or cargo bed of a pickup truck. When the vehicle (not shown) becomes stuck in ice or snow the device 74 may be unrolled and placed beneath the drive wheels of the vehicle. In order to economize, the cleats 24 may be placed at ¼" intervals.

Figure 8A:
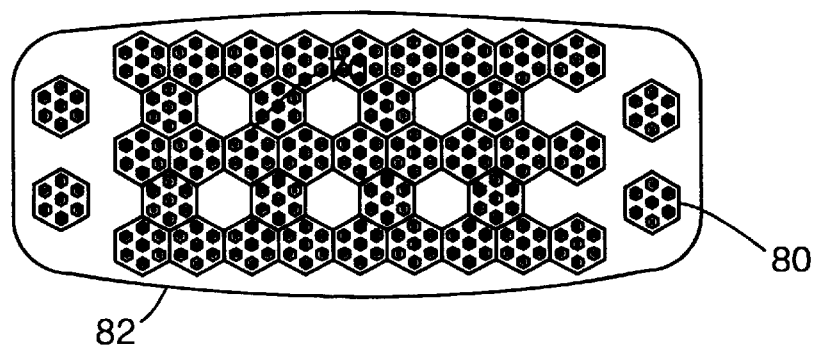
FIG. 8(a) shows a top view of a third embodiment of the traction enhancing article applied to a skateboard.
Figure 8B:
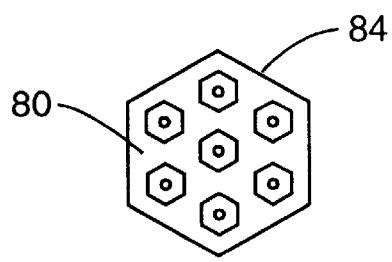
FIG. 8(b) shows a closeup of the sections of the traction enhancing article applied to the skateboard.

FIGS. 8(a) and 8(b) shows a plurality of sections 80 of the article 10 of the present invention applied to a skateboard 82. As can be seen, the sections 80 are hexagonal as are the bases of the cleats 24. The bases 30 of the cleats 24 are rotated so as to define a hexagonal pattern concentric with the edges 84 of the section 80 as can be seen more clearly in FIG. 8(b). It can be readily appreciated that the section may be arranged in accordance with the foot placement of the user. A similar arrangement of sections 80 may be used for a snowboard.

Figure 10:
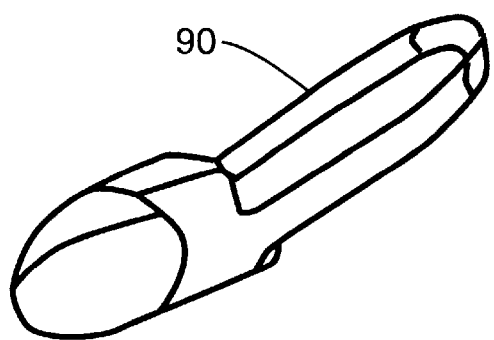
FIG. 10 shows a perspective view of the device of FIG. 3.
Figure 9:
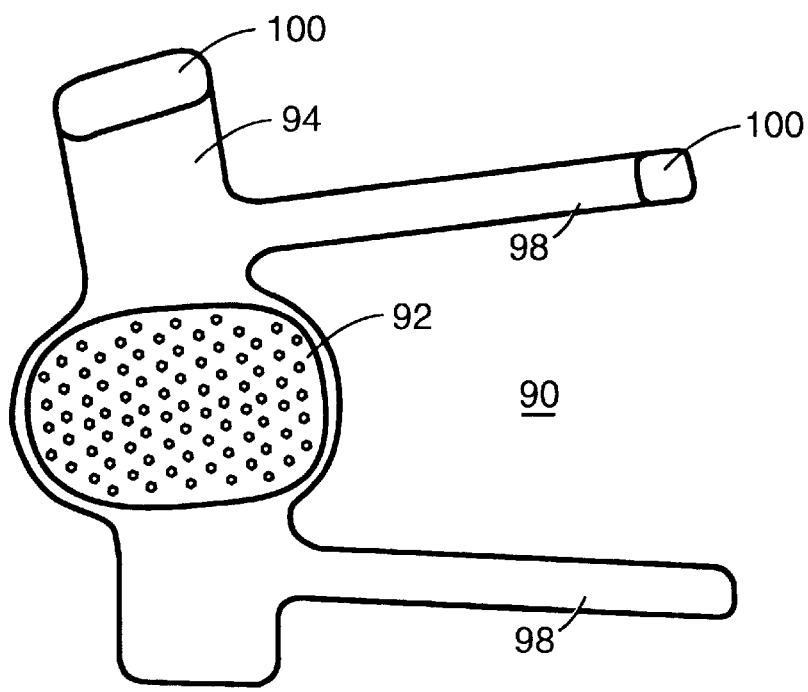
FIG. 9 shows a bottom view of the traction enhancing article applied to a device which can be applied to shoes.

Referring now to FIGS. 9 and 10 an attachment 90 for a shoe employing the present invention is shown. The attachment 90 is adapted to be secured to any type of shoe as shown in FIG. 10. A centrally located section 92 of the article 10 of the present invention is secured within a recess formed in the attachment 90. The section 92 covers the sole portion of the shoe (not shown) to which it is attached. A pair of large rectangular flaps 94 extend outwardly from section 92. Each flap 94 has a hook and loop type of fastener 96 secured thereto to facilitate adjustably securing the attachment 90 about the sole and forward portion of the shoe. A pair of straps 98 extend rearwardly from the section 92 and can be adjustably secured about the rear portion of the shoe via hook and loop type fasteners 100. It can be readily appreciated that both straps 98 and flaps 94 are designed with some overlap to allow the attachment 90 to be used with a wide range of shoe sizes. The attachment 90 may be made from a rubber/nylon compound or equivalent elastic durable material.

Figure 11:
FIG. 11 is a side view of patches which can be used with a hockey garment.
Figure 12:
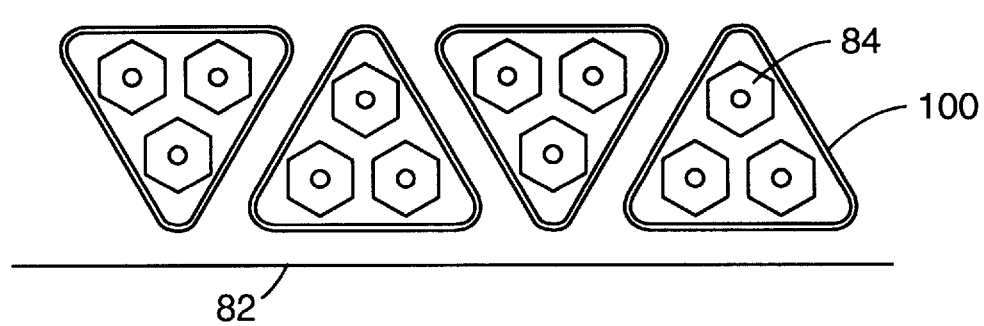
FIG. 12 is a side view of the patch shown in FIG. 11.
Figure 13:
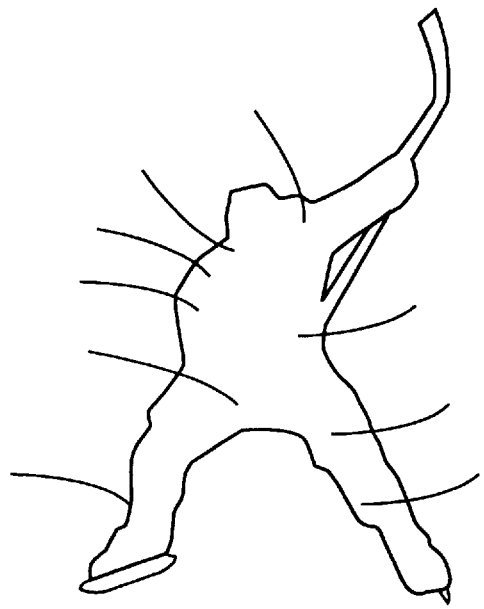
FIG. 13 is an outline of a user wearing a hockey garment indicating positioning of the patches on the garment.

Referring to FIGS. 11–13, the garment patches of the present invention, including the garment 100 to which they are attached, is shown. The garment 100 and associated patches 102 can be used to stop excessive sliding of a user on ice or hard packed snow. Although the primary use of the garment 100 and associated patches 102 is for a hockey garment, other uses are envisioned as will be explained later.

Each patch 102 has four basic components, a first rubber layer or base 112, a second rubber layer 114 which is adhered to the first rubber layer 112, the cleats 110 with protruding tip 118, and, in some embodiments, an adhesive layer, not shown. The patch 102 is made using the same method and materials as described above.

The arrangement of cleats 110 as shown in FIG. 1 is preferably three to a group, with each group situated on a raised portion of the second or upper layer 114. Other arrangements may be employed as may be necessary to increase or decrease the amount of traction provided by the patch 102. It can be readily appreciated that varying the density of the cleats 110 and the size of the patches 102 will vary the traction.

The patches 102 may be applied to the garment 100 in at least three different ways. The patch 102 may be sewn into the garment 100 in which case a permanent application is envisioned. The patch 102 may also be applied to the garment 100 using an adhesive. Finally, the patch 102 may be applied to a pad (not shown) which may be attached to the garment 100 at various positions using straps or belts.

The patches 102 are preferably positioned on the garment 100 over areas of the users body which are likely to come into contact with the ice upon falling, as is best illustrated in FIG. 13. Additionally, patches 102 are placed on the back of gloves or any other part of the garment 100 which a user may deliberately move into contact with the ice to effect a braking action.

Numerous applications of the patches 102 are envisioned. The primary application is for hockey players who collide and fall at high speeds. The device would prevent pile-ups and other potentially dangerous situations which may occur when a player falls at high speed and slide into another group of players. As has been previously mentioned, the number, density, and position of the patches 102 and cleats 110 may be varied according to the application and the amount of slide prevention required.

Additionally, the patches 102 may be applied to garment 100 which are worn by persons participating in other winter sports such as speed skating and skiing. Also the patches 102 may be worn by mountain climbers to prevent them from sliding on slippery rock faces.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims:

I claim:

1. A traction enhancing article of manufacture comprising:

a flexible base, said base having an adhesive layer formed on a first side, said adhesive layer having a plurality of cleats securely embedded therein, said cleats having a polygonal shaped base and a protruding tip, said polygonal shaped base having a generally convex shape and downwardly extending corners with arcuate sides extending between said corners;

a second layer, said second layer having a plurality of apertures formed therein, the spacing of said apertures corresponding to the spacing of said cleats, the second layer being adhered to said base with said cleats protruding through said apertures;

said polygonal base extending beneath and covered by said second layer.

2. The article of claim 1 wherein said cleats are formed from a sheet of aluminum.

3. The article of claim 1 wherein said cleats have roughened surfaces to enhance bonding to said adhesion layer.

4. The article of claim 1 wherein the spacing of said cleats may be varied in accordance with a particular application.

5. The article of claim 1 wherein groups of said cleats are attached to various portions of a garment.

* * * * *